(12) United States Patent
Shatters

(10) Patent No.: US 8,820,509 B2
(45) Date of Patent: Sep. 2, 2014

(54) AUTONOMOUS MOBILE CONVEYOR SYSTEM

(75) Inventor: Aaron R. Shatters, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 738 days.

(21) Appl. No.: 12/967,809

(22) Filed: Dec. 14, 2010

(65) Prior Publication Data

US 2012/0146387 A1    Jun. 14, 2012

(51) Int. Cl.
 *B65G 21/10* (2006.01)
 *B65G 41/00* (2006.01)
 *E21F 13/08* (2006.01)

(52) U.S. Cl.
 CPC .............. *E21F 13/08* (2013.01); *B65G 41/008* (2013.01)
 USPC ........................................... 198/300; 299/1.9

(58) Field of Classification Search
 None
 See application file for complete search history.

(56) References Cited

U.S. PATENT DOCUMENTS

| | | | |
|---|---|---|---|
| 4,934,505 A | 6/1990 | Rodenberg et al. | |
| 5,749,452 A | 5/1998 | Kanenwischer | |
| 5,810,447 A | 9/1998 | Christopher et al. | |
| 6,155,400 A | 12/2000 | Daigh et al. | |
| 6,283,277 B1 | 9/2001 | Smith et al. | |
| 6,336,545 B1 | 1/2002 | Arndt et al. | |
| 6,460,937 B2 | 10/2002 | Seear et al. | |
| 7,191,889 B1 * | 3/2007 | Heley | 198/315 |
| 7,500,814 B2 | 3/2009 | Meyer | |
| 8,317,116 B2 * | 11/2012 | Dirk et al. | 241/30 |
| 2007/0216216 A1 | 9/2007 | Baird, Jr. et al. | |
| 2009/0071796 A1 | 3/2009 | Petermann et al. | |

FOREIGN PATENT DOCUMENTS

WO    WO 02/48506    6/2002

* cited by examiner

*Primary Examiner* — Kavel Singh
(74) *Attorney, Agent, or Firm* — Finnegan, Henderson, Farabow, Garrett & Dunner LLP

(57) ABSTRACT

A conveyor system for a use with mining machine is provided. The conveyor system may have a plurality of conveyor segments operatively connected end-to-end, a first of the plurality of conveyor segments also being configured to connect to the mining machine. The conveyor system may also have a plurality of mobile base supports each being configured to support one of the plurality of conveyor segments, and at least one controller for communication with the mining machine and the plurality of mobile base supports. The at least one controller may be configured to determine a desired location of the mining machine different from a current location of the mining machine, and to determine a required trajectory of the plurality of conveyor segments based on the desired location of the mining machine. The at least one controller may also be configured to communicate the required trajectory to each of the plurality of mobile base supports to move the mobile base supports into alignment with the required trajectory.

17 Claims, 2 Drawing Sheets

AUTONOMOUS MOBILE CONVEYOR SYSTEM

TECHNICAL FIELD

The present disclosure is directed to a conveyor system and, more particularly, to an autonomous mobile conveyor system.

BACKGROUND

Conveyor systems are often used in mining applications to transport material excavated by a mining machine, for example a reclaimer, to a remote processor. The conveyor systems can include multiple sections of conveyors connected end-to-end, each section having an endless belt that transports material to the neighboring section. In some applications, the conveyor system is mobile so as to move along with the mining machine and/or processor. In particular, the sections can include wheels or tracks driven by dedicated electric or hydraulic drive units to rotate, with the first section connected to the mining machine and the last section connected to the remote processor. When particular drive units are activated, a contour of the trajectory of the entire conveyor system may be changed. When all of the drive units are simultaneously activated, the entire system may be transported to a new mining location.

An exemplary conveyor system is disclosed in U.S. Pat. No. 6,155,400 of Daigh et al. that issued on Dec. 5, 2000 ("the '400 patent"). Specifically, the '400 patent discloses a conveyor system having a plurality of segments and articulable joints connecting adjacent segments. Each segment is provided with an individually controllable drive unit for moving the conveyor segment. Each joint between segments is provided with a sensor to measure the amount of articulation at each joint. The conveyor system is further provided with a manually operable control system for aligning the segments based on an alignment survey of each joint provided by the sensors. Velocities of each of the drive units are then determined and regulated by the control system based on the alignment survey such that the different segments are brought into alignment at the same time.

Although perhaps sufficient for some mining applications, the system of the '400 patent may be limited to trajectories that are nearly or completely straight. These trajectories may limit movements of an associated mining machine and decrease mining efficiencies. In addition, because the system of the '400 patent may be manually operable, it may require significant time from a skilled operator.

The disclosed autonomous conveyor system is directed to overcoming one or more of the problems set forth above and/or other problems of the prior art.

SUMMARY

In one aspect, the disclosure is directed toward a conveyor system for a mining machine. The conveyor system may include a plurality of conveyor segments operatively connected end-to-end, a first of the plurality of conveyor segments also being configured to connect to the mining machine. They conveyor system may also include a plurality of mobile base supports each being configured to support one of the plurality of conveyor segments, and at least one controller for communication with the mining machine and the plurality of mobile base supports. The at least one controller may be configured to determine a desired location of the mining machine different from a current location of the mining machine, and to determine a required trajectory of the plurality of conveyor segments based on the desired location of the mining machine. The at least one controller may also be configured to communicate the required trajectory to each of the plurality of mobile base supports to move the mobile base supports into alignment with the required trajectory.

In another aspect, the disclosure is directed toward a method of transporting material. The method may include processing material at a current first location, and transporting the material along a current first trajectory from the current first location to a current second location. The method may also include determining a desired third location at which to process material, and determining a desired second trajectory along which to transport material between the desired third location and the current second location. The method may additionally include communicating the desired second trajectory to a plurality of mobile base supports of a conveyor system to move the conveyor system into alignment with the desired second trajectory.

DETAILED DESCRIPTION

Figure 1:
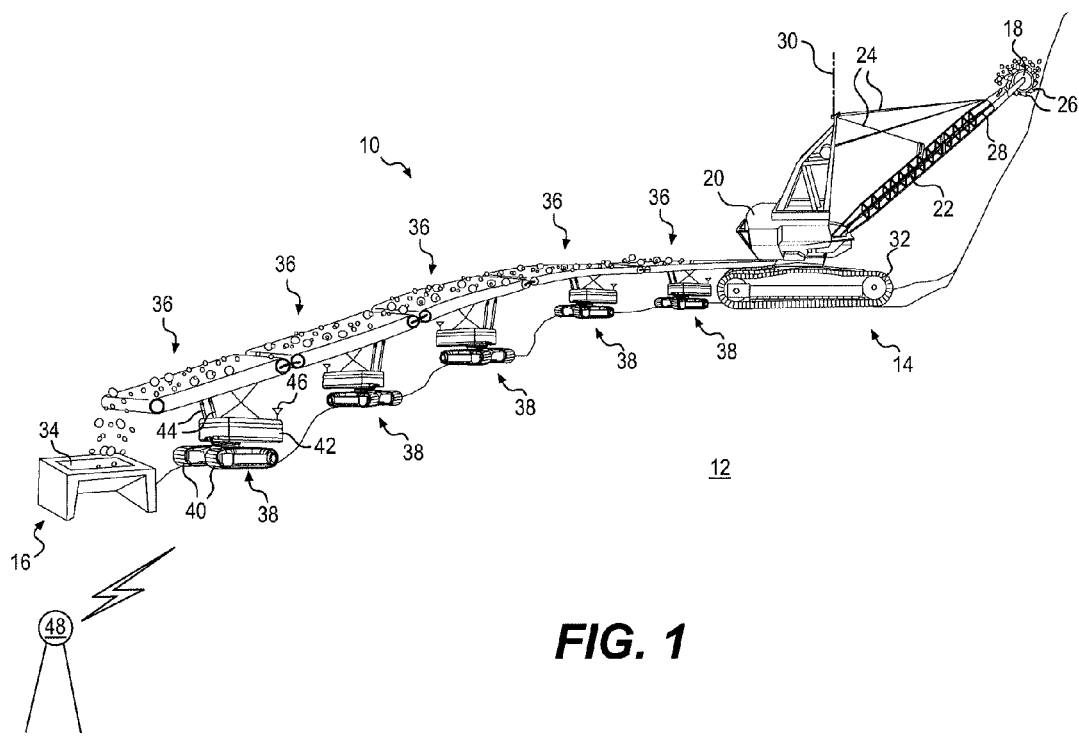
FIG. 1 is a pictorial illustration of an exemplary disclosed conveyor system.

FIG. 1 illustrates an exemplary conveyor system 10 configured to transport material between two locations at a worksite 12. In one embodiment, worksite 12 may be associated with a mining operation and embody, for example, an open pit mine. It is contemplated, however, that conveyor system 10 may be utilized to transport material at other sites, if desired. A first mining machine 14 may be located at one end of conveyor system 10, within the open pit mine. In one example, a second mining machine 16 may be located at an opposing end of conveyor system 10. In this configuration, material may be loaded onto conveyor system 10 by first mining machine 14 and transported by conveyor system 10 into second mining machine 16. It is contemplated, however, that machine 16 may be omitted, if desired, and material transported by conveyor system 10 may be dumped onto a ground surface at worksite 12.

In the example of FIG. 1, first mining machine 14 may be a large-scale excavation machine such as a reclaimer that is used in open pit mining. As a reclaimer, first mining machine 14 may be outfitted with a sizable wheel 18 that is distally connected to a body 20 by way of a gantry member 22 and associated rigging 24. A plurality of scoops or buckets 26 may be connected around an outer periphery of wheel 18. When wheel 18 is rotatably driven, scoops 26 may together function as a continuous digger tearing material from the landscape of worksite 12 and dumping the material into a chute 28 that extends a length of gantry member 22. Machine 14 may be configured to rotate about an axis 30 and thereby swing wheel 18 to move to a new area of excavation. In addition, rigging 24 may be controlled to selectively lift and lower wheel 18 to move the area of excavation. Machine 14 may also include traction devices 32 that are driven to mobilize machine 14. In one example, traction devices 32 may include continuous tracks that are rotatably driven to propel machine 14 between excavation areas. In another example, traction devices 32 may include feet that are cyclically driven to walk machine 14 between excavation areas. Material excavated by machine 14 may dump from chute 28 onto an end of conveyor system 10 for transportation to second mining machine 16.

Second mining machine 16 may embody a material processor. Many different types of material processors may be available for use with conveyor system 10, and the selection of processor may be at least partially dependent on the material being excavated by first mining machine 16. For example, second mining machine 16 could embody a crusher or a grinding mill configured to reduce a material size; a sieve or vibration table configured to sort the material by size, type, quality, etc.; a stacker configured to selectively load the material onto waiting haul vehicles; or any other type of processor known in the art. Second mining machine 16 may include a hopper opening 34 configured to receive material from an end of conveyor system 10 opposite first mining machine 14.

Conveyor system 10 may include a plurality of conveyor segments 36, each conveyor segment 36 being connected at an end thereof to at least one other conveyor segment 36. A first of conveyor segments 36 located at one end of conveyor system 10 may be associated with first mining machine 14, while a last of conveyor segments 36 located at an opposite end of conveyor system 10 may be associated with second mining machine 14. In one embodiment, first mining machine 14 may be fixedly connected to the first conveyor segment 36 such that, as first mining machine 14 moves, the corresponding end of conveyor system 10 may also move. It is contemplated that the last conveyor segment 36 may similarly be connected to move with second mining machine 16, if desired. Each of conveyor segments 36 between the first and last conveyor segments 36 may be connected to two other adjacent conveyor segments 36. Any number of conveyor segments 36 may be included within conveyor system 10. It is contemplated that segments 36 of conveyor system 10 may each include a separate transport mechanism (e.g., belt, chain, track, etc.) or, alternatively, that conveyor system 10 may include a single, common, continuous transport mechanism that extends along an entire length thereof and is separately supported by segments 36, if desired.

Conveyor segments 36 may utilize conventional components known the art to transport material from first mining machine 14 to second mining machine 16. In the disclosed embodiment, conveyor segments 36 may be substantially identical, have a fixed length, and be relatively rigid in the length direction (i.e., conveyor segments 36 may not stretch or compress significantly in length). Conveyor segments 36 may, however, be relatively flexible in a transverse direction. That is, conveyor segments 36 may be configured to bend and have an associated minimum bend radius. If bent to a radius smaller than the minimum bend radius, damage to the components of conveyor segments 36 may occur. Regardless of the bending of conveyor segments 36, the overall center-line length of conveyor segments 36 may remain substantially constant.

Each conveyor segment 36 may be elevated off of the ground surface at worksite 12 by an associated mobile base support 38. In one embodiment, mobile base support 38 may be a crawler type machine having opposing traction devices 40 that are driven by a power source 42. Traction devices 40 may be, for example, continuous tracks or wheels, some or all of which are driven and steerable. Power source 42 may be, for example, an electric motor powered by onboard batteries or an offboard tether (e.g., an AC bus) that extends from an electric power supply at one end of conveyor system 10 to all mobile base supports 38. It is contemplated that power source 42 could alternatively embody a combustion engine, if desired. Conveyor segments 36 may be connected to an upper portion of mobile base supports 38 and configured to pivot relative to traction devices 40. In one embodiment, mobile base supports 38 be provided with one or more actuators 44, for example hydraulic cylinders, that may be used to lift and/or tilt the associated conveyor segments 36.

Each of mobile base supports 38 may be autonomously controlled. Specifically, each of mobile base supports 38 may include a communications module 46 in communication with at least one controller 48. In one embodiment, controller 48 may be a single offboard worksite controller 48. In another embodiment, each mobile base support 38 may include an associated onboard controller 48. Each communications module 46 may include hardware and/or software that enables sending and receiving of data messages through a direct data link and/or a wireless communication link, as desired. The direct data link may include an Ethernet connection, a connected area network (CAN), or another data link known in the art. The wireless communications may include satellite, cellular, infrared, and any other type of wireless communications that enable communications modules 46 to exchange information with controller(s) 48 and/or with machines 14, 16. Based on commands from controller(s) 48, each of communications modules 46 may be configured to regulate movement and/or operations of the associated mobile base support 38 (e.g., movement of traction devices 40, power source 42, and/or actuators 44). Communications modules 46 may also be configured to send operational information associated with components of mobile base support 38 to controller(s) 48, if desired. This information may include, for example, a gps location of mobile base supports 38, a location and/or orientation of the associated conveyor segments 36, traction device speed and/or orientation, hydraulic cylinder position, status information (e.g., functioning or malfunctioning, temperatures, velocities, pressures, etc.), and other information known in the art.

Each controller 48 may embody a single or multiple microprocessors, field programmable gate arrays (FPGAs), digital signal processors (DSPs), etc., that include a means for controlling operations of conveyor segments 36, mobile base supports 38, first mining machine 14, and/or second mining machine 16 in response to operator requests, built-in constraints, and sensed or communicated information. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

Each controller 48 may be configured to dynamically control positioning of conveyor system 10 as first and/or second mining machines 14, 16 move. In particular, as one or both of first and second machines 14, 16 move, conveyor system 10 should be repositioned to help ensure a proper flow of material from first mining machine 14 into second mining machine 16 without damage to components of conveyor system 10. The flow of material may be affected by a trajectory of conveyor system 10 at endpoints thereof, while the integrity of conveyor system 10 may be affected by physical constraints of each conveyor segment 36. Accordingly, in response to an operator requested or desired movement of one or both of first and second mining machines 14, 16 from a current first position to a new second position, each controller 48 may determine a corresponding required trajectory of conveyor system 10 and communicate the required trajectory to each of mobile base supports 38.

The trajectory of conveyor system 10 should be determined according to particular physical constraints to help avoid damage to components thereof. These physical constraints may include, among others, a desired angular relationship of the first and last conveyor segments 36 with respect to first and second mining machines 14, 16; the fixed length of each conveyor segment 36; and the minimum bend radius of each conveyor segment 36. In the example shown in FIG. 2, terminal end portions of the first and last conveyor segments 36 may be generally parallel with an axis 50 passing through first and second mining machines 14, 16. That is, the trajectory of conveyor system 10, at the terminal end portions, may be parallel within an angle α of about ±20° relative to axis 50. This angular alignment may facilitate smooth material flow transitions between conveyor system 10 and first and second mining machines 14, 16. In addition, an overall distance between first and second machines 14, 16 (i.e., a length of axis 50) may be kept less than a combined length of all conveyor segments 36. Further, no curvature of the overall trajectory may have a radius smaller than the minimum bend radius of individual conveyor segments 36. In most instances, the required trajectory may have a generally s-shaped curve.

Controller 48 may communicate with first and/or second mining machine 14, 16 and with each mobile base support 38 to determine a current position of each component and the new desired mining machine location. Based on this information and the constraints described above, controller 48 may then determine the required trajectory of conveyor system 10 from first mining machine 14 to second mining machine 16, taking into account the new desired mining machine location(s). If the required trajectory is not possible, given the above constraints, controller 48 may communicate this information to the appropriate mining machine 14, 16 and advise that another location should instead be selected.

Each controller 48 may determine the required trajectory by fitting a function through the new location(s) of first and/or second mining machines 14, 16 (i.e., through the end points of axis 50), and constraining the function in the manner described above (i.e., by segment length, bend radius, and terminal angle). In one example, the function may be a fifth order polynomial. In another example, the function may be a combination of sine and cosine curves (e.g., a multiplication function of sine and cosine). Once the function of the trajectory has been determined, an arc length integral of the function may be numerically solved to find a new position for each mobile base support 38 that aligns each mobile base supports 38 along the required trajectory. It is contemplated that the arc length integral may be performed by the sole worksite controller 48 for all mobile base supports 38 before communication of any information to mobile base support 38, or that only the trajectory function may be performed by each individual onboard controller 48, as desired.

Based on the current and new locations of each mobile base support 38 and based on terrain maps store in memory, mobile base supports 38 may move to their new positions as first and/or second mining machines 14, 16 also move to their new excavation area(s). It is contemplated that the mining machine movement may be initiated at the same time as movement of all of mobile base supports 38 (i.e., that all movement is simultaneous), or that movement may begin with the appropriate mining machine 14, 16 and sequentially propagate along the length of conveyor system 10, as necessitated by local physical constraints. It is also contemplated that movement of individual mobile base supports 38 may be regulated by the sole worksite controller 48 or that the movement may be regulated independently by the independent controllers 48 onboard each mobile base support 38.

Figure 2:
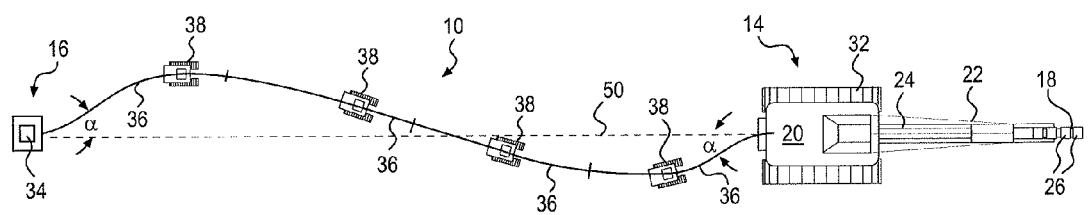
FIG. 2 is a diagrammatic illustration of the conveyor system of FIG. 1.
Figure 3:
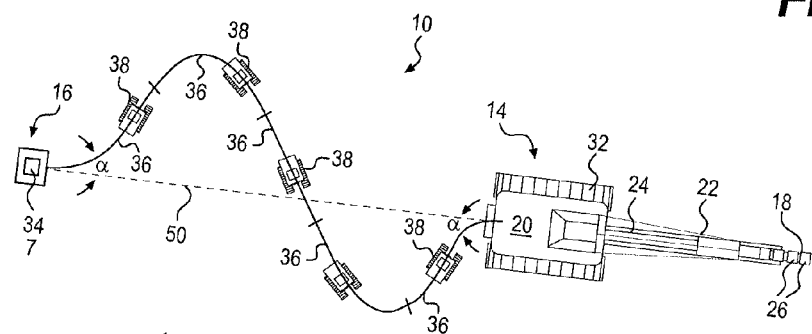
FIG. 3 is another diagrammatic illustration of the conveyor system of FIG. 1
Figure 3:
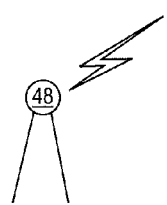

FIG. 3 illustrates conveyor system 10 having a trajectory different from that of FIG. 2. FIG. 3 will be discussed in more detail in the following section to further illustrate the disclosed concepts.

INDUSTRIAL APPLICABILITY

The disclosed conveyor system may be implemented into any material moving application where a loading and/or unloading location changes. The disclosed conveyor system may facilitate dynamic loading/unloading location changes by autonomously moving segments of the conveyor system based on a desired end location and on physical constraints of the system. The conveyor system may be capable of curved trajectories, reduced operator time, and improved system efficiencies. Operation of conveyor system 10 will now be described.

During operation of conveyor system 10, first mining machine 14 may be removing material from the excavating location shown in FIG. 2, while second mining machine 16 may be receiving material at the processing location also shown in FIG. 2. Conveyor system 10 may receive material from first mining machine 14 and dump the material into second mining machine 16. At some point in time, first mining machine 14 may have nearly removed all material in its immediate vicinity and, accordingly, the operator thereof may indicate a desire to move first mining machine 14 to the excavating location shown in FIG. 3. The excavating location shown in FIG. 3 may be closer to the processing location than shown in FIG. 2, and further to the right as viewed from an operator's perspective.

Based on the current location of second mining machine 16, the desired new location of first mining machine 14, the overall length constraints of individual conveyor segments 36, the minimum curvature radius of each conveyor segment 36, and the terminal end angle constraint of first and last conveyor segments 36, controller(s) 48 may determine a new trajectory for conveyor system 10. As shown in FIG. 3, the new trajectory may have tighter curves (i.e., curves with smaller radiuses), and mobile base supports 38 may be closer together. However, the center-line length of each conveyor segment 36 may be the same in the trajectory of FIG. 3 as it is in FIG. 2, and the terminal end angles may be within about ±20° of axis 50.

After determining the new trajectory required to position first mining machine 14 at the new excavating location, controller(s) 48 may either determine the corresponding locations of each individual mobile base support 38. Based on the current position of each mobile base support 38, based on the new positions, and based on terrain maps stored in memory, each controller 48 may then command its associated mobile base support 38 to initiate corresponding movements as first mining machine 14 begins its move toward the new excavating location. As described above, movement of all components may be triggered simultaneously or, alternatively, start with first mining machine 14 and sequentially move along conveyor system 10 toward second mining machine 16, as necessary. It is contemplated that material excavating, transporting, and/or processing may be halted during the relocation of components, or that these processes may be completed simultaneously, as desired.

It will be apparent to those skilled in the art that various modifications and variations can be made to the disclosed conveyor system. Other embodiments will be apparent to those skilled in the art from consideration of the specification and practice of the disclosed conveyor system. It is intended that the specification and examples be considered as exemplary only, with a true scope being indicated by the following claims and their equivalents.

What is claimed is:

1. A conveyor system for a mining machine having a movable mining implement, comprising:
  a plurality of conveyor segments operatively connected end-to-end, a first of the plurality of conveyor segments also being configured to connect to the mining machine;
  a plurality of mobile base supports each being configured to support one of the plurality of conveyor segments;
  at least one controller for communication with the mining machine and the plurality of mobile base supports, the at least one controller being configured to:
    determine a desired location of the mining machine different from a current location of the mining machine;
    determine a required trajectory of the plurality of conveyor segments based on the desired location of the mining machine; and
    communicate the required trajectory to each of the plurality of mobile base supports to move the mobile base supports into alignment with the required trajectory; and
  when each of the plurality of mobile base supports is configured to:
    determine a movement required to reposition itself along the required trajectory; and
    implement the movement as the mining machine moves from the current location to the desired location within constraints imposed by adjacent segments of the plurality of conveyor segments.

2. The conveyor system of claim 1, wherein the required trajectory is determined before movement of the mining machine from the current location to the desired location.

3. The conveyor system of claim 2, wherein the constraints include at least one of a length and a minimum curvature radius of the adjacent segments.

4. The conveyor system of claim 3, wherein each of the plurality of conveyor segments has a finite length and is transversely flexible.

5. The conveyor system of claim 4, wherein the required trajectory is a general s-curve.

6. The conveyor system of claim 5, wherein:
  a free end of a last of the plurality of conveyor segments is connected to a processor;
  the at least one controller is further configured to determine a desired location of the processor different from a current location of the processor; and
  the required trajectory of the plurality of conveyor segments is further determined based on the desired location of the processor.

7. The conveyor system of claim 6, wherein a curvature radius of each of the plurality of conveyor segments becomes smaller as the processor nears the mining machine.

8. The conveyor system of claim 7, wherein the required trajectory at a machine end and at a processor end is generally parallel with an axis passing through the processor and the mining machine.

9. The conveyor system of claim 1, wherein the at least one controller is a worksite controller located remotely from the plurality of conveyor segments and configured to communicate with the plurality of mobile base supports wirelessly.

10. The conveyor system of claim 1, further including a plurality of communications modules, each of the plurality of communication modules being associated with one of the plurality of mobile base supports and in communication with the at least one controller.

11. The conveyor system of claim 1, wherein the mining machine is a reclaimer and the conveyor is configured to connect to a base portion of the reclaimer to receive material from a chute of the conveyor.

12. A method of transporting material, comprising:
  processing material at a current first location;
  transporting the material along a current first trajectory from the current first location to a current second location;
  determining a desired third location at which to process material;
  determining a desired second trajectory along which to transport material between the desired third location and the current second location;
  communicating the desired second trajectory to a plurality of mobile base supports of a conveyor system to move the conveyor system into alignment with the desired second trajectory;
  determining a required movement of each of the plurality of mobile base supports based on the desired second trajectory and constraints imposed by adjacent segments of the conveyor system; and
  implementing the movement as a mining machine having a movable mining implement moves from the current second location to the desired third location.

13. The method of claim 12, wherein the constraints imposed by adjacent segments of the conveyor system include length and curvature constraints.

14. The method of claim 13, wherein the desired second trajectory is a general s-curve.

15. The method of claim 14, wherein the desired second trajectory is generally parallel at end points to an axis passing through the end points.

16. The method of claim 13, wherein the required movement for each of the plurality of mobile base supports is determined before movement of material processing from the current first location to the desired third location.

17. A mining system, comprising:
  a reclaimer located at a current first position;
  a processor located at a current second position;
  a plurality of conveyor segments operatively connected end-to-end, a first of the plurality of conveyor segments also being operatively connected to the reclaimer and a last of the plurality of conveyor segments operatively connected to the processor, wherein each of the plurality of conveyor segments has a finite length and is transversely flexible;
  a plurality of mobile base supports each being configured to support one of the plurality of conveyor segments; and
  at least one controller in communication with the reclaimer and the plurality of mobile base supports, the at least one controller being configured to:
    determine a first desired position of the reclaimer different the current first position and a second desired position of the processor different from the current second position;
    determine a required trajectory of the plurality of conveyor segments based on the first desired position and the second desired position location, the finite lengths of the plurality of conveyor segments, and minimum radius curvatures of the plurality of conveyor segments; and
    communicate the required trajectory to each of the plurality of mobile base supports to move the mobile base supports into alignment with the required trajectory,
  wherein each of the plurality of mobile base supports is configured to:

determine a movement required to reposition itself along the required trajectory; and implement the movement into alignment with the required trajectory as the reclaimer and processor move to the first and second desired positions and as limited by adjacent conveyor segments.

\* \* \* \* \*